March 11, 1930. R. H. CHILTON 1,750,346

SPRING SHACKLE

Filed Jan. 21, 1927

Inventor
Ralph H Chilton
By Spencer Hardman & Fehr
his Attorneys

Patented Mar. 11, 1930

1,750,346

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

SPRING SHACKLE

Application filed January 21, 1927. Serial No. 162,649.

This invention relates to pivot joints wherein all movement occurs by internal distortion of the non-metallic elastic material therein, and has particular reference to vehicle spring shackles and the pivot joints in various linkage connections in automobile construction.

An object of the invention is to provide an elastic rubber pivot joint which is inexpensive to manufacture and install and of improved efficiency and life in use.

A more specific object is to provide such a joint wherein the rubber material is easily put under as high initial compression as desired.

Another object is to provide a rubber jointed spring shackle whose lateral movement or "side sway" is limited by a direct compression of the rubber bushing due to the tapering central member. Another object is to provide a rubber pivot joint which prevents dirt, mud, etc., from entering crevices and thereby causing rapid deterioration of the rubber material.

Further objects and advantages of the the present invention will be apparent from the following description, reference being had to the accompanying drawings, wherein a preferred form of embodiment of the present invention is clearly shown.

In the drawings.

Similar reference characters refer to similar parts throughout the drawings.

Figure 3:
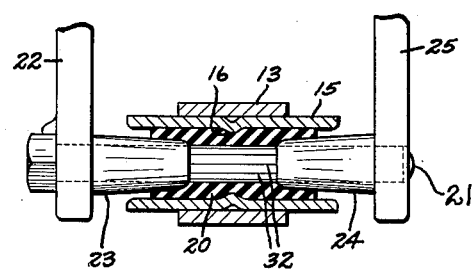
Fig. 3 is a view showing the non-distorted shape of the rubber bushing before the annular wedges have been forced inwardly, and illustrates the method of assembling the parts.

Numeral 10 designates the long leaf of the rear spring of the automobile, which is connected by means of the extension shackle to the downwardly curved end member 11 suitably fixed to the chassis side rail 12. A spring eye 13 is rolled in the end of spring leaf 10. A metal tube 15 of such length as to give the desired bearing area upon the rubber bushing is held rigid in spring eye 13, preferably by a pressed fit. This tube 15 has an internal flange or bead 16 formed therein at the center thereof. An elastic rubber bushing 20 of such diameter that it can be easily forced into tube 15 past the internal flange 16 is inserted to lie centrally therein, as shown in Fig. 3. The normal non-distorted shape of bushing 20 is shown in Fig. 3.

A similar tube 15' with elastic rubber bushing 20 therein is held rigid, preferably by a pressed fit, within an eye in the end member 11 of the chassis side rail 12.

The two bolts 21 are next inserted through holes in the side link 22 and the metal annular wedges 23 slipped over the bolts 21 against the side link 22. The two bolts 21 are then inserted through the central bore in the two bushings 20 and the opposite annular wedges 24 and the other side link 25 inserted over the projecting ends of bolts 21, as illustrated in Fig. 3. The side links 22 and 25 are forced toward each other sufficiently to permit the lock washers 26 and nuts 27 to be started on the threaded ends of bolts 21. Now when both the nuts 27 are screwed up evenly together the annular wedges 23 and 24 are forced with great pressure inwardly against the elastic rubber blocks 20 causing the rubber to be displaced and flow endwise to fill the space between the wedges 23 and 24 and tube 15. Preferably the original molded form and size of the rubber bushings 20 is such that when the side links 22 and 25 are brought to their final positions, shown in Fig. 2, the elastic rubber will bulge out at the small clearance spaces 30 between the side links and tubes 15 and 15', as clearly shown in Fig. 2. This will prevent mud, dirt, etc., from finding lodgment in these crevices and finally working its way into the bushing to cause rapid deterioration thereof.

The high pressure under which the elastic rubber bushings 20 are held by the wedges 23 and 24 forces the surfaces thereof into tight non-slipping engagement with the contacting metal parts. All pivotal movement at both pivot joints will therefore be taken by the internal distortion within the elastic rubber. The side link 22 is non-rotatably fixed to the bolts 21 by the lugs 28 which engage the flat sides of the bolt heads. The annular wedges 23 and 24 are preferably positively held non-rotatably upon the bolts 21 by cooperating flutes or serrations 31 and 32. The lock washers 26 engage the side link 25 and the nuts 27 which are pinned in final position by pins 33 to bolts 21 and thus hold bolts 21 against turning within their holes in link 25. It will now be clear that the side links 22 and 25, the bolts 21, and the annular wedges 23 and 24 are all rigidly fixed together and swing as one piece when the spring is deflected. Any other suitable means for fixing these parts rigidly together may be provided and I do not wish to be limited to the particular means illustrated and described.

Figure 1:
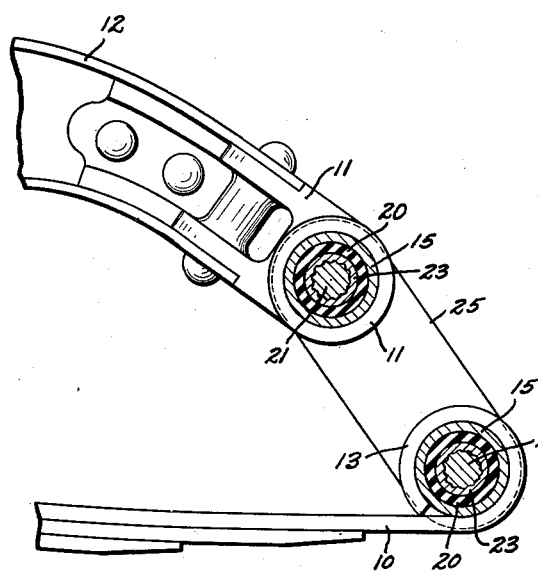
Fig. 1 is a view taken on line 1—1 of Fig. 2, and shows an automobile spring shackle built according to this invention.
Figure 2:
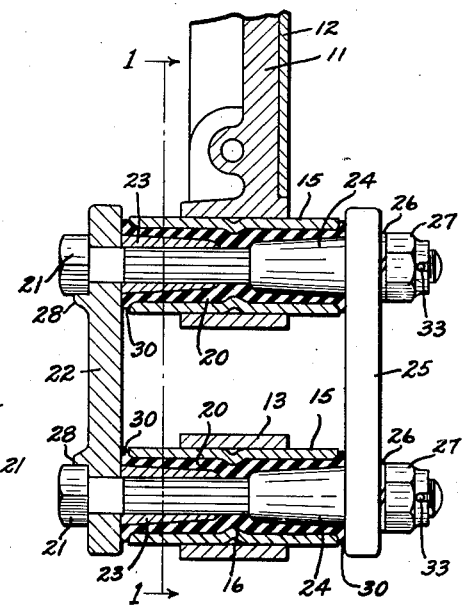
Fig. 2 is a sectional view through the shackle, certain parts being shown in full.
Figure 4:
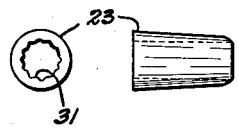
Fig. 4 shows end and side elevations of the small annular wedges.

Since the rubber bushings 20 are originally molded in the shape shown in Fig. 3 and are then elongated by the annular wedges 23 and 24 to the form shown in Fig. 2, there will be little or no tendency for the elastic rubber to bulge out further at the points 30 when the load comes upon the shackle. It is thus seen that the relatively small amount of rubber used in the shackle will sustain a high load per unit bearing area without excessive bulging out at the annular clearance spaces 30.

It will be obvious that any lateral thrust upon the shackle, such as occurs when the automobile turns corners, will be sustained by a direct compression of the rubber between the tapered annular wedges and the tube 15 with the internal flange 16 therein. At such times the flange 16 resists the tendency of the elastic rubber to flow laterally from the side which is being compressed by this lateral thrust to the opposite side.

While only a double pivot extension shackle has been illustrated and described in detail, it is obvious that a single pivot shackle, such as occurs on the front end of the front automobile spring, can be represented by the lower half of Fig. 2. The two parts 22 and 25 in that case would be rigidly attached to the side rail of the chassis frame.

While the form of embodiment of the present invention as herein disclosed, constitutes a preferred form, it is to be understood that other forms might be adopted, all coming within the scope of the claims which follow.

What is claimed is as follows:

1. In combination with the spring and frame of a vehicle, a shackle comprising: transverse eye members fixed to the spring and frame respectively and located adjacent one another, elastic rubber bushings within said eye members, said bushings in non-distorted condition being shorter than said eye members, a pin extending through each of said bushings and having annular wedges therearound, means for holding said annular wedges forced inwardly to compress the rubber bushing and to distort it to the full length of the eye member, and two side links interconnecting said pins and non-rotatably secured thereto.

2. In combination with the spring and frame of a vehicle, a shackle comprising: transverse eye members fixed to the spring and frame respectively and located adjacent one another, elastic rubber bushings within said eye members, said bushings in non-distorted condition being shorter than said eye members, a pin extending through each of said bushings and having inwardly tapering annular wedges adjacent each end thereof, two side links interconnecting said pins, and common means for non-rotatably securing said side links to said pins and forcing said annular wedges inwardly to compress the rubber bushing and distort it to the full length of the eye member.

3. In combination with the spring and frame of a vehicle, a shackle comprising: transverse eye members fixed to the spring and frame respectively and located adjacent one another, elastic rubber bushings within said eye members, said bushings in non-distorted condition being shorter than said eye members, a bolt extending through each of said bushings and having inwardly tapering annular wedges adjacent each end thereof, two side links interconnecting said two bolts, and nuts on said bolts for drawing said side links and said annular wedges inwardly to compress the rubber bushing and distort it to the full length of said eye member.

4. A pivot joint between two relatively rotatable parts, comprising, an eye member fixed to one of said parts, an elastic rubber bushing in said eye member, said bushing in non-distorted condition being normally of materially shorter length than said eye member, an isolated pivot pin extending through said bushing and secured to the other of said parts and having inwardly tapering annular wedges therearound adjacent each end thereof, and means for holding said annular wedges forced inwardly to compress the rubber bushing and distort it substantially to the length of said eye member, whereby the rubber is held in tight contact with its contacting metal parts and subjected to internal twist during pivotal movement between said connected parts.

5. A pivot joint between two relatively rotatable parts, comprising, an eye member fixed to one of said parts and having an internal flange at its central portion, an elastic rubber bushing in said eye member, said bushing in non-distorted condition being normally of materially shorter length than said eye member, an isolated pivot pin extending through said bushing and secured to the other of said parts and having inwardly tapering annular wedges therearound adjacent each end thereof, and means for holding said annular wedges forced inwardly to compress the rubber bushing and distort it substantially to the length of said eye member, whereby the rubber is held in tight contact with its contacting metal parts and subjected to internal twist during pivotal movement between said connected parts.

6. In combination, a leaf spring having an eye, a tubular member having an internally projecting flange at its central portion held fixed within said eye, an elastic rubber bushing within said tubular member, a pivot pin extending through said bushing and having two inwardly tapering annular wedges around its opposite ends, means for holding said annular wedges forced inwardly to initially compress the rubber bushing and to elongate it by distortion, and a member rigidly secured to said pivot pin.

7. A pivot joint between two relatively rotatable parts, comprising, a tubular member rigid with one of said parts and having an internally projecting flange at its central portion, an elastic rubber bushing centrally located within said tubular member and of materially shorter length when in non-distorted condition, a central member extending through said bushing and having inwardly tapering enlargements held forced against said bushing to compress the rubber bushing and to elongate it by distortion to the length of said tubular member, said central member being rigid with the other of said rotatable parts.

8. A pivot joint between two relatively rotatable parts, comprising an eye member rigid with one of said parts, a non-metallic elastic bushing within said eye member and of materially shorter length when in non-distorted condition, a central pivot member extending through said bushing and having an inwardly tapering enlargement thereon held forced against said bushing to compress and materially elongate the same by distortion, said central pivot member being rigid with the other of said rotatable parts.

9. A pivot joint between two relatively rotatable parts, comprising an eye member rigid with one of said parts, a non-metallic elastic bushing within said eye member and of shorter length when in non-distorted condition, a central pivot member extending through said bushing and having elongated sleeves thereon held forced inwardly against said bushing to compress and elongate the same by distortion, said central pivot member being rigid with the other of said rotatable parts, whereby said bushing is subjected to internal twist during pivotal movement between said parts.

10. In combination, a leaf spring having an eye, a metal sleeve held fixed within said eye and projecting laterally on each side thereof, a non-metallic elastic bushing within said sleeve, a pivot pin extending through said bushing and having sleeves slidably fixed thereon and held forced against the elastic bushing to compress and elongate the same by distortion, and a member rigidly secured to said pivot pin whereby pivotal motion between said member and leaf spring is permitted by internal distortion of said elastic bushing.

In testimony whereof I hereto affix my signature.

RALPH H. CHILTON.